United States Patent

[11] 3,548,134

| [72] | Inventor | Millard C. Harthan, Jr.<br>67 Summit Ave., North Plainfield, N.J. 07060 |
|---|---|---|
| [21] | Appl. No. | 837,284 |
| [22] | Filed | June 27, 1969 |
| [45] | Patented | Dec. 15, 1970 |

[54] STOP LIGHT SWITCH SYSTEM FOR AUTOMOBILES
2 Claims, 4 Drawing Figs.

[52] U.S. Cl. ..................................... 200/86.5, 200/133
[51] Int. Cl. ..................................... H01h 3/54
[50] Field of Search ............................. 200/82.2, 83.34, 83.91, 86, 86.5, 153.19

[56] References Cited
UNITED STATES PATENTS

| 2,525,824 | 10/1950 | Nagel | 200/86X |
| 3,083,278 | 3/1963 | Mukai | 200/86.5 |

Primary Examiner—Robert K. Schaefer
Assistant Examiner—J. R. Scott
Attorney—Charles H. Recht ABSTRACT: An improved stoplight switch system for automobiles and the like is disclosed and which includes a heel actuated switch that is closed whenever a driver's heel is removed from the accelerator pedal. The closing of the switch energizes the brake lights and thereby gives an advance warning of an imminent braking operation of the vehicle as the driver's foot is removed from the accelerator.

INVENTOR
MILLARD C. HARTHAN, JR
BY
ATTORNEY

PATENTED DEC 15 1970

INVENTOR
MILLARD C. HARTHAN, JR
BY Charles H. Recht
ATTORNEY

STOP LIGHT SWITCH SYSTEM FOR AUTOMOBILES

BACKGROUND OF THE INVENTION

My invention relates to an improved stoplight switch system for automobiles and in particular to a switch system that will provide a quicker and more rapid indication that a car is decelerating and is about to be braked by its driver.

In the traffic congestion currently prevailing, it is well known that many accidents and rear end collisions occur because the driver of the second car did not quickly react to the stop signal provided by the lead car as its driver depressed the brake pedal. A car traveling at 60 M.P.H. travels 88 ft./sec. and therefore, a difference of even a few tenths of a second in reaction time may mean the difference between a safe stop by the driver of the second car and a rear end collision.

Although the typical car generates a stop signal when its brake pedal is depressed, this signal is not generated until one-half second or so after the driver had decided to brake his car. In this one-half second interval, the driver is in the process of removing his foot from the accelerator pedal and transferring it to the brake pedal. With this arrangement a signal is not developed by the brake lights of the first car until the second car has traveled 44 feet after the instant of time the driver of the first car has decided to stop. This 44 feet often may be critical and the difference between an accident or a safe stop. Arrangements such as accelerator foot switches have been heretofore proposed. However, these are disadvantageous in that they generate false stop signals when the driver momentarily removes his foot from the accelerator when not intending to brake his car.

BRIEF SUMMARY OF THE INVENTION

It is therefore an object of the invention to provide an improved stop signal switch system for an automobile.

In accordance with my invention, I provide an improved stoplight signal system which includes a heel-actuated switch immediately to the rear of the accelerator and installed flush with the floor of the car.

In the normal driving of vehicles embodying my invention the driver's foot is on the accelerator pedal and his heel rests on my switch so that its contacts are held open. However, as soon as the driver lifts his foot from the switch and the accelerator pedal, preparatory to a braking operation, the switch contacts close and immediately complete a circuit to energize the brake light of the vehicle. This expedient provides a driver of a second car with advance warning of the fact that the car ahead of him is decelerating and that its brakes are about to be or are being applied.

These and other objects and advantages of my invention will become apparent upon a reading of the following description thereof taken in conjunction with the drawing in which:

FIG. 1 discloses my stoplight switch assembly and illustrates its relationship to the accelerator pedal and the foot of the driver of the vehicle;

FIG. 2 discloses the details of my switch assembly with its components being shown in a spaced apart relationship from each other;

FIG. 3 discloses a vertical cross section of the switch shown on FIG. 2 when fully assembled; and FIG. 4 discloses the brake light circuit of a vehicle embodying my invention.

DETAILED DESCRIPTION

Figure 1:
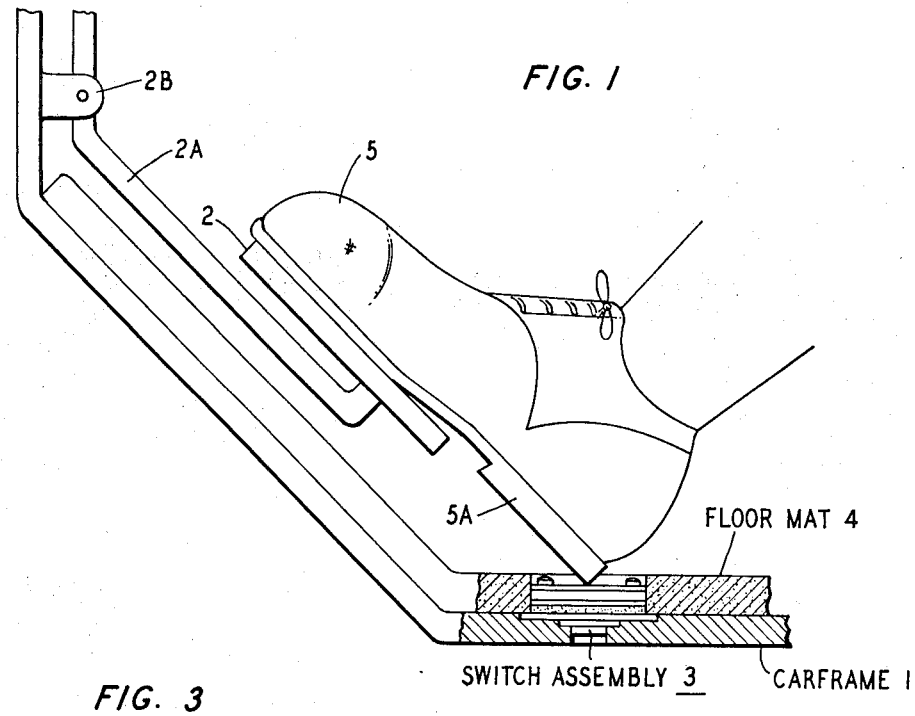

FIG. 1 discloses the forward portion of a car floor or frame 1, an accelerator pedal 2, the switch assembly 3, of my invention, and the shoe 5 of a driver of the vehicle. The accelerator pedal 3 is attached to a lever member 2A whose other end (not shown) is attached to the carburetor linkage to control the speed of the vehicle. Member 2A is pivotably affixed by a pin and member 2B to the forward fire wall portion of frame 1.

The switch assembly 3 is partly positioned in a cutout of frame 1 and partly in a cutout in floor mat 4 so that the top portion of the switch assembly is coplanar with the top of mat 4. The switch assembly 3 is also positioned to the rear of the accelerator pedal 2 so that, during normal driving conditions, the shoe of the driver rests on pedal 2 as well as on switch assembly 3. The pressure of the heel 5A of shoe 5 against the upper surface of the switch assembly maintains the switch contacts open so that the brake light of the vehicle is not energized. However, the switch contacts close as soon as heel 5A is raised off of switch assembly 3 when the driver removes his foot from the accelerator and prepares to brake the vehicle. The closing of these contacts energizes the brake lights immediately and thereby gives advance warning to the driver of a trailing car.

Figure 3:
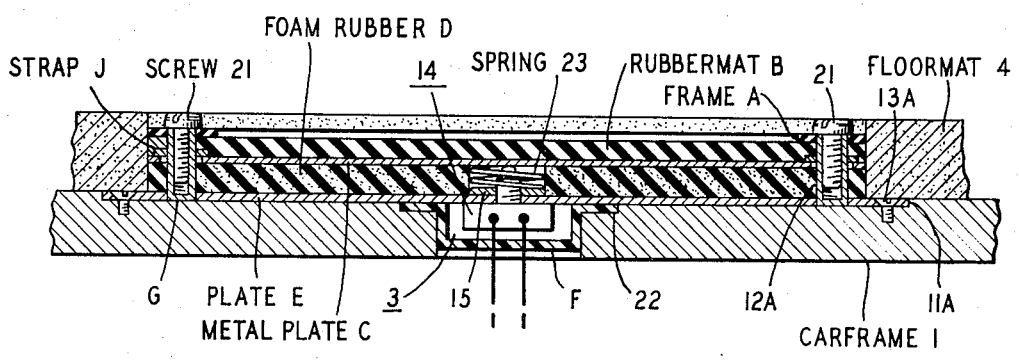
Figure 2:
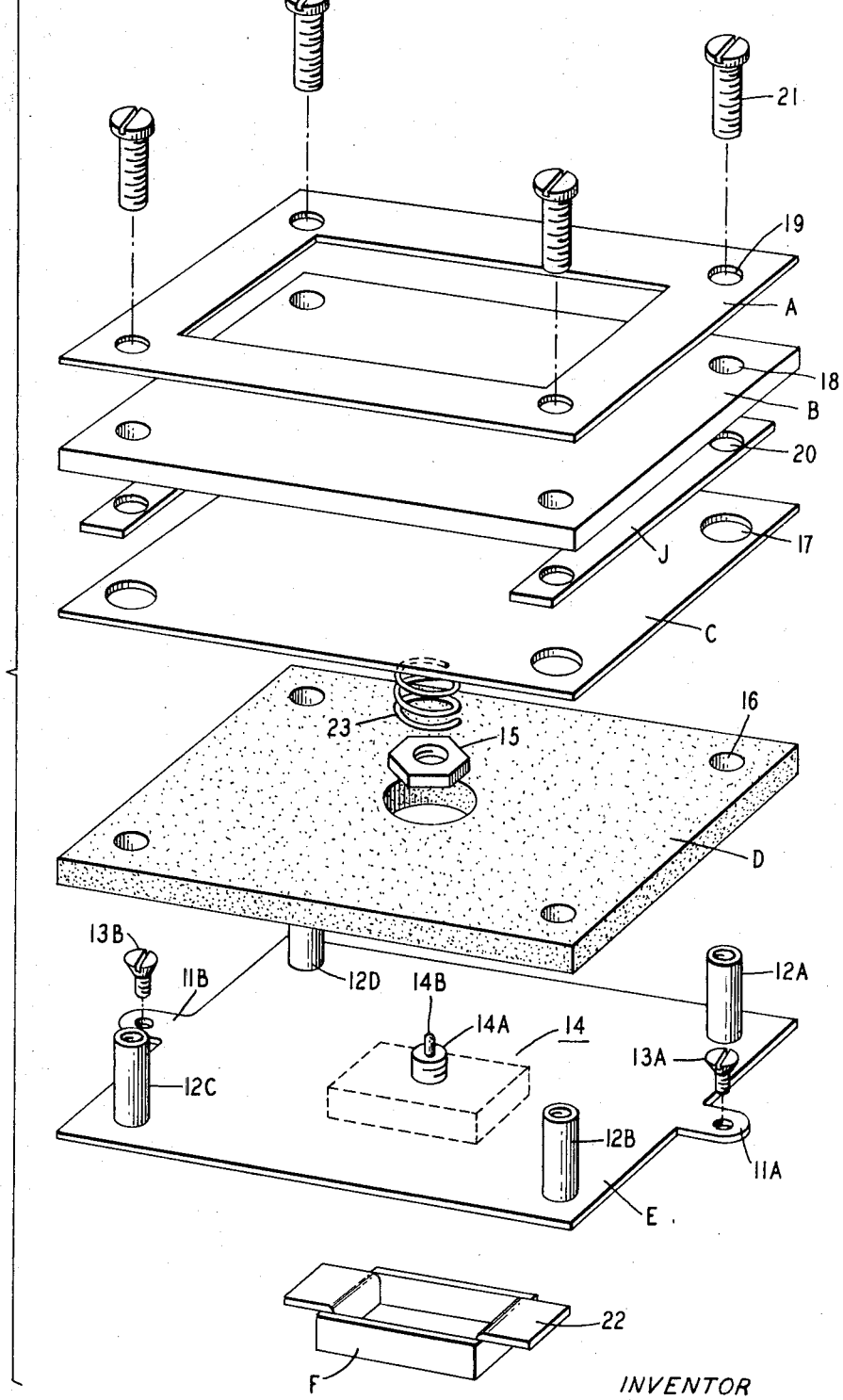

The details of my switch assembly 3 are shown in expanded form in FIG. 2 while FIG. 3 shows a vertical cross section. With reference to both FIGS. 2 and 3 where like elements bear like designations, the switch assembly includes a bottom mounting plate E having a hole in its center through which protrudes the threaded neck portion 14A of a snap switch 14 whose body is positioned below plate E. Nut 15 is threaded onto the neck 14A of switch 14 to hold it firmly in position. Pin 14B of switch 14 is slidably positioned within neck 14A. The depression of pin 14B opens the switch contacts which are otherwise normally closed when the pin is raised. The metal cover F is positioned below plate E with the hollow portion of the box being designed to receive the switch 14 when cover F is mounted against the lower surface of plate E. The function of box F is to protect switch 14 from injury by flying rocks, etc., on the bottom side of the car.

The four spacers 12 (12A through 12D) are affixed by any suitable means to each corner of mounting plate E as shown on FIG. 2. The upper portion of each spacer 12 is drilled and tapped to receive one of screws 21. After the nut 15 is tightened onto neck element 14A, spring 23 is positioned over the portion of neck 14A that protrudes beyond the nut 15.

A foam rubber member D having corner holes adapted to receive spacers 12 is lowered and positioned on top of mounting plate E. The center of foam rubber member D has a hole sufficiently large in diameter to receive nut 15 and spring 23. Metal plate C is then lowered and positioned on top of member D so that its corner holes receive spacers 12. Each corner hole 17 of plate C is large enough in diameter so that plate C may be pivoted or depressed downward about any spacer 12 by a depressive downward force on any portion thereof. When so positioned, the top of spring 23 presses upwards against the bottom of plate C. A strap J is then positioned on top each side of plate C with the holes in the right strap member J receiving the spacers 12A and 12B. The holes of the other strap J receive spacers 12C and 12D when the strap is positioned on the left top end of plate C. Next rubber mat B is positioned on top plate C with holes 19 of mat B receiving spacers 12.

Frame member A having corner holes 19 is then positioned over the mat B with its holes 19 in alignment with spacers 12. Screws 21 are then inserted through holes 19 and into the hollowed out and tapped portion of spacers 12. The switch assembly is then positioned, after screws 21 are tightened, on the car floor or frame 1 as shown on FIG. 3. A suitable opening in the frame receives cover F and plate E is affixed to the frame by means of ears 11A and 11B and screws 13A and 13B. Screws 13A and 13B hold the assembly fixed with respect to the car frame. Ears 22 of member F rest on top of an opening in frame 1 as shown in FIGS. 1 and 3.

The upward pressure provided by spring 23 normally forces plate C away from the pin 14B so the switch contacts are closed. However, the pressure of the driver's heel as the car is in operation maintains plate C and switch pin 14B depressed. This holds the switch contacts open. However, whenever the driver removes his foot from the accelerator, the plate C rises under the influence of the spring, the switch contacts close, and the stoplights are immediately energized.

Figure 4:
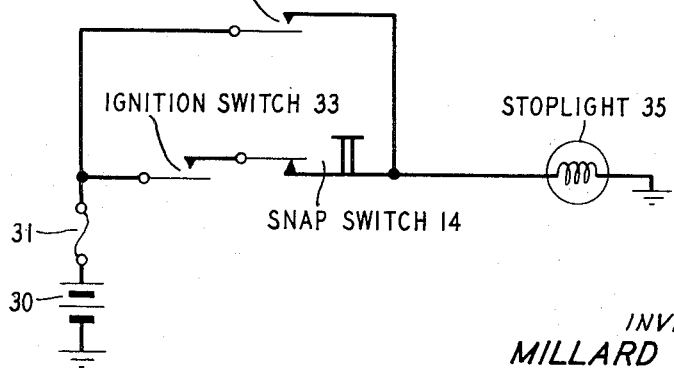

FIG. 4 discloses a simplified stoplight circuit of an automobile embodying my invention. The stoplight 35 is in a first series circuit comprising brake pedal switch 32, fuse 31 and battery to ground. The light is energized whenever the brake pedal is depressed to close the switch 32 contacts. Lamp 35 is also in a second series circuit comprising snap switch 14, ignition switch 33, fuse 31 and battery 30 to ground. In this circuit, the lamp 35 is energized after the ignition switch 33 is closed whenever switch contacts 14 are closed as the driver's foot is not resting against plate C to hold pin 14B down.

I claim:

1. In a vehicle having a foot controlled accelerator, a brake signal light, and a floor mounted switch assembly adapted to be controlled by the heel portion of the driver's foot that controls said accelerator so that said brake light is off when the switch assembly is engaged by said heel and so that said light is energized whenever said heel is removed from said switch assembly preparatory to a braking operation of said vehicle, said switch assembly comprising: a rectangular-shaped horizontal mounting plate, a hole extending vertically through the center of said plate from its bottom to its top surface, a switch positioned on the underside of said plate, a threaded stud portion of said switch extending upwards through said hole with the upper extremity of said stud portion extending above the top surface of said plate, a nut having inner threads and adapted to be screwed onto said stud portion for holding said switch on to said plate, a vertically oriented switch control pin slidably positioned in the center of said stud portion and extending upwards beyond the top extremity of said stud, four vertically extending spacers each of which is affixed to the top surface of said plate near each corner thereof, a foam rubber mat positioned adjacent the top surface of said plate and having corner holes for receiving said spacers and a center hole for receiving said nut, a coil spring vertically oriented and positioned on top of said nut with said pin extending coaxially through said springs, a control plate positioned atop said foam rubber mat and having corner holes for receiving said spacers, said corner holes of said control plate being larger in diameter than said spacers so that said control plate may pivot downwardly about any of said spacers and against said spring and said pin, a rubber mat positioned adjacent the top surface of said control plate and having corner holes for receiving said spacers, a top frame member positioned over and adjacent said mat and having corner holes for receiving said spacers, screws for extending into a top drilled out portion of each of said spacers for urging said frame downwards against said mat, said spring being tensioned to urge said control plate upwards to reduce the downward force on said pin, ear means on said mounting plate for mounting said assembly to said vehicle floor over a cutout therein to the rear of said accelerator, contact means on said switch, said contact means being held open whenever said pin is depressed downward by said heel resting on said control plate, and said contact means being closed when said heel is removed from said control plate so that said spring urges said control plate upwards and permits said pin to travel upwards.

2. In a vehicle having a brake signal light and a floor mounted switch assembly adapted to be controlled by the heel portion of the driver's foot so that said light is off when the switch assembly is engaged by said heel and so that said light is energized whenever the driver's foot is removed from said assembly, said switch assembly comprising a rectangular shaped horizontal mounting plate, a hole extending vertically through said plate, a switch positioned on the under side of said plate, a threaded stud portion of said switch extending upwards through said hole with the upper extremity of said stud portion extending above the top surface of said plate, a vertically oriented switch control pin slidably positioned in the center of said stud portion and extending upwards beyond the top extremity of said stud portion, vertically extending spacers each of which is affixed to the top surface of said plate near each corner thereof, a foam rubber mat positioned atop and adjacent said plate and having corner holes for receiving said spacers and a center hole for receiving said nut, a coil spring vertically oriented and positioned on top of said plate with said pin extending coaxially through said spring, a control plate positioned atop said foam rubber mat and having corner holes for receiving said spacers, said corner holes of said control plate being larger in diameter than said spacers so that said control plate may pivot downwardly about any of said spacers, said spring being tensioned to urge said control plate upwards to reduce the downward force on said pin, contact means on said switch, said contact means being held open whenever said pin is depressed downward by said heel resting on said control plate, and said contact means being closed whenever said spring urges said control plate upwards so that said pin can travel upwards.